United States Patent
Fehn et al.

[11] Patent Number: 5,657,410
[45] Date of Patent: Aug. 12, 1997

[54] FILLER FOR AN OPTICAL TRANSMISSION ELEMENT HAVING AT LEAST ONE OPTICAL WAVEGUIDE

[75] Inventors: Ingeburg Fehn; Rainer Kamps, both of Bundersrepublik, Germany

[73] Assignee: Siemens Aktiengesellschaft, Munich, Germany

[21] Appl. No.: 553,263

[22] PCT Filed: May 2, 1994

[86] PCT No.: PCT/DE94/00481

§ 371 Date: Nov. 13, 1995

§ 102(e) Date: Nov. 13, 1995

[87] PCT Pub. No.: WO94/27174

PCT Pub. Date: Nov. 24, 1994

[30] Foreign Application Priority Data

May 13, 1993 [DE] Germany ............................ 43 16 123.5

[51] Int. Cl.$^6$ .............................. G02B 6/44; H02G 15/00
[52] U.S. Cl. ......................... 385/102; 385/100; 385/109; 523/173
[58] Field of Search ...................... 385/100, 102, 385/105, 109, 110, 114, 141; 523/173

[56] References Cited

U.S. PATENT DOCUMENTS

| | | | |
|---|---|---|---|
| 4,342,500 | 8/1982 | Oestreich et al. | 385/100 X |
| 4,370,023 | 1/1983 | Lange et al. | 385/100 X |
| 4,605,694 | 8/1986 | Walker | 524/292 |
| 4,701,016 | 10/1987 | Gartside, III et al. | 385/100 X |
| 4,757,100 | 7/1988 | Wichelhaus et al. | 523/173 |
| 5,020,875 | 6/1991 | Arroyo et al. | 385/102 X |
| 5,109,457 | 4/1992 | Panuska et al. | 385/102 |
| 5,324,588 | 6/1994 | Rinehart et al. | 428/475.8 |
| 5,356,710 | 10/1994 | Rinehart | 428/378 |

FOREIGN PATENT DOCUMENTS

| | | | |
|---|---|---|---|
| 1104394 | 7/1981 | Canada | 385/100 X |
| 0 029 198 | 7/1984 | European Pat. Off. | 385/100 X |
| 27 28 642 | 1/1979 | Germany | 385/100 X |
| 38 39 596 | 5/1990 | Germany | 385/100 X |
| 2059097 | 4/1981 | United Kingdom | 385/100 X |
| WO92/00368 | 1/1992 | WIPO | 385/100 X |
| WO92/00368 | 2/1992 | WIPO | 385/100 X |

*Primary Examiner*—Brian Healy
*Attorney, Agent, or Firm*—Hill, Steadman & Simpson

[57] ABSTRACT

Filler for an optical transmission element having at least one optical waveguide The filler for an optical transmission element containing at least one optical waveguide contains a plasticizer.

26 Claims, 1 Drawing Sheet

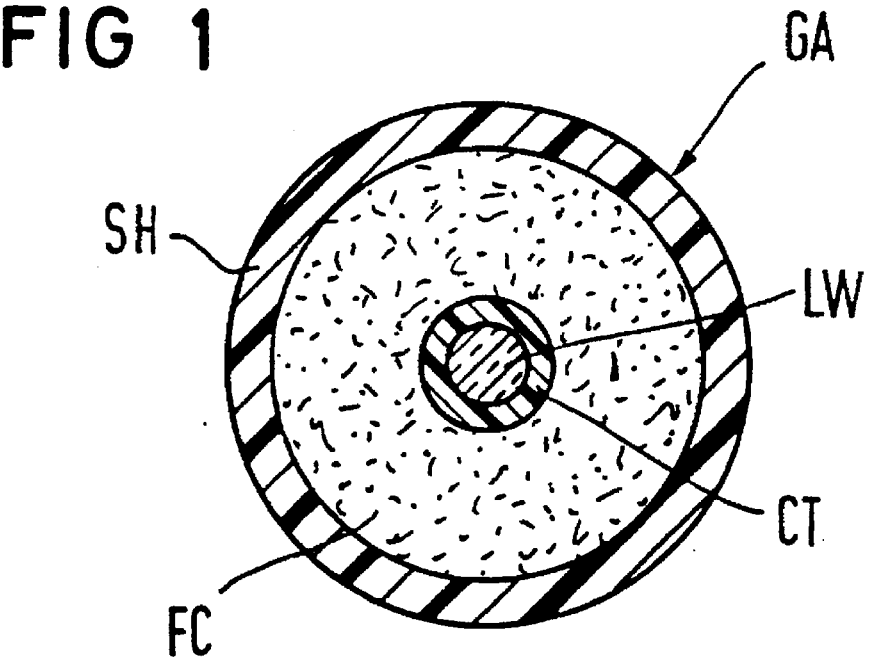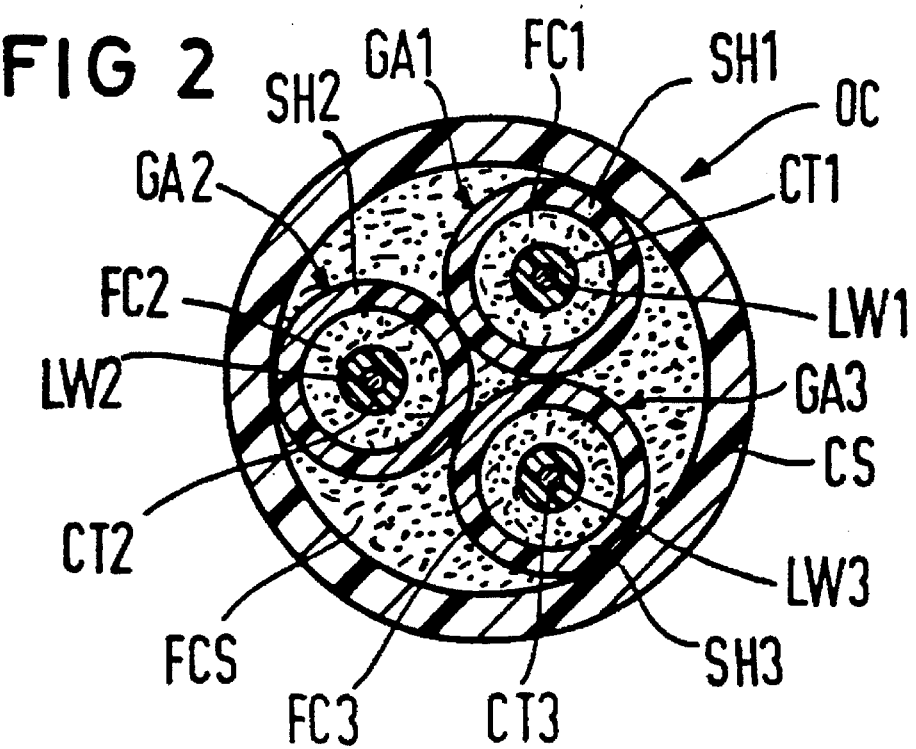

FILLER FOR AN OPTICAL TRANSMISSION ELEMENT HAVING AT LEAST ONE OPTICAL WAVEGUIDE

BACKGROUND OF THE INVENTION

The invention relates to filler for an elongated optical transmission element which contains at least one optical waveguide and at least one protective covering enclosing the optical waveguide, the filler having a component in the form of a plasticizer.

U.S. Pat. No. 4,342,500 discloses a cable which is high voltage-resistant and can therefore be used in the region of high voltage installations. If such a cable were filled only with crosslinked synthetic materials (polyurethane, epoxy resin, polyester resin, see column 1, lines 58 and 59), air gaps would then be unavoidable. Owing to the high field strength concentrations, these air gaps would lead to difficulties. For this reason, these existing plastics materials are plasticized by the addition of appropriate plasticizers, because it is possible in this way to avoid the formation of such undesirable cavities. Thus, the addition of plasticizers in this prior art reference has the sole purpose of plasticizing the existing plastics material sufficiently to achieve complete filling of all gaps with the plasticized plastics material and thus to overcome the difficulties with the high voltage fields.

WO 92/00368 discloses a filler for optical waveguide cables, which filler may contain polypropyleneoxyglycol (PPG), as is evident from the examples in Table 1 on page 16 and from Examples 6–11 disclosed on page 14. However, these polypropyleneoxygiycols may be considered to be suitable for use only when having molecular weights of at least 3000. Molecular weights between 3000 and 8000 are preferably used, as disclosed in claim 1 of the reference. Page 14, lines 22 to 24, discloses that embodiments 6 and 7 are not suitable for use and that molecular weights of more than 3000 are therefore used.

EP 029 198 91 discloses a filler for optical transmission elements which comprises a mixture of an oil and a thixotropic agent and additionally contains an organic thickener which completely or partially comprises halogenated and/or halogen-free hyarocarbon polymers. Other fillers likewise containing oils are described in DE 38 39 596 A1 and U.S. Pat. No. 4,701,016. German Offenlegungsschrift 27 28 642 discloses a longitudinally water-tight optical waveguide cable in which swollen polystyrene in oil is used as a lead filling material or wire filler. GB-A 2 059 097 discloses an optical cable which contains a cable sheet comprising stabilized PVC material. Such cable sheets must be flexible and in particular the cable sheet cannot become rigid when low temperatures are encountered. In order to ensure sufficient flexibility at temperatures down to −50° C., the PVC compound of the cable sheet contains a di(2-ethylhexyl) sebacate (DOS) plasticizer. Specifically, the PVC compound may contain 45 to 70 parts by weight of the DOS plasticizer, 10 to 50 parts by weight of a filler and 3 to 8 parts by weight of stabilizers, relative to 100 parts by weight of the PVC. This compound is converted into granules, which can be applied to a cable core containing optical waveguides by means of an extruder. This prior art states nothing about the use of a filler, i.e., a material which can be arranged between a cable sheet and the optical waveguides.

The requirements which such wire fillers have to meet are that the optical waveguides are as far as possible not subjected to any impermissible tensile and/or compressive forces, i.e. the filler must not be too rigid. Since this should also be the case at relatively low temperatures, for example −30°, the oils used have to meet particularly high requirements so that they do not harden excessively at the low temperatures. Furthermore, these fillers should be sufficiently resistant to dripping out (drip test), and this is a critical requirement particularly at relatively high temperatures. By using thixotropic agents in the known wire fillers, it is possible to advantageously influence the behavior, particularly at relatively high temperatures, to which the use of thickeners finally also contributes. However, the disadvantage of the known fillers is that their molecular composition is relatively non-uniform, owing to the different base components used. Furthermore, expensive base oils must be used if the wire filler is to meet high requirements. Moreover, conventional fillers also interact with polyolefins, i.e. exhibit an increase in mass of >5% by weight. As a result, the properties of the polyolefin wire sheaths change.

SUMMARY OF THE INVENTION

It is the object of the invention to provide a filler which can be prepared in a particularly economical manner. This object is achieved, according to the invention, in the case of a filler of the type stated at the outset, if monomeric plasticizers are used; if the molecular weight of the monomeric plasticizer is chosen between 200 and 2000 g/mol; if the plasticizer accounts for between 30% by weight and 99% by weight and preferably between 80% by weight and 95% by weight of the filler; and if the filler acquires its characteristic behavior through the proportion of plasticizer within the total composition.

The invention is furthermore achieved if the plasticizers used comprise one or more PVC plasticizers but not including those which consist of polypropylene glycol; if the plasticizer accounts for between 30% by weight and 99% by weight and preferably between 80% by weight and 95% by weight of the filler; and if the filler acquires its characteristic behavior through the proportion of plasticizer within the total composition.

Such plasticizers are relatively cheap as they are used in large amounts in chemistry. They also have the advantage that they are substantially inert, that is to say in particular that they do not attack or impair, for example, protective coverings or cable sheaths. Such plasticizers can be particularly readily processed, have a low vapor pressure and are mostly odorless, colorless and in general also light-stable, stable to low temperatures and heat-stable. A further advantage of the plasticizers is that they are not hygroscopic, which is important particularly in connection with optical waveguides, owing to their $H_2$ sensitivity. Moreover, such plasticizers are not hazardous to health, have low flammability and are not very volatile. When plasticizers are used, the increase in mass of polyolefin wire sheaths is <1% by weight.

Another major advantage of the plasticizers is that they have relatively high molecular uniformity of their compounds. In particular, so-called monomer plasticizers have complete molecular uniformity. However, polymer plasticizers also exhibit relatively high molecular uniformity of their compounds. Hence, the properties, such as the temperature behavior, the flashpoint, the vapor pressure, the viscosity and the drip behavior, can be particularly readily adjusted and stabilized. The use of molecules having a relatively uniform composition has a particularly advantageous effect, especially on the drip behavior.

In the invention, plasticizers which are still liquid at 20° C. or have a viscosity of less than 15,000 mPa·s are preferably used. Hence, the processing effected at room temperature (for example, introduction of the filler into a protective covering or into a cable sheath) can be carried out in a particularly simple and rapid manner.

Apart from the plasticizers, additional substances may be introduced into the filler, but the amount of the plasticizers should account for between 30% by weight and 99% by weight with the total composition, preferably between 80% by weight and 95% by weight. The characteristic behavior of the filler is thus imparted to it by the proportion of the plasticizer within the total composition.

Since the plasticizers are also readily compatible with one another and are miscible, it is also possible to introduce plasticizers having different chemical compositions into the filler. Hence, when the term plasticizer is used below, this means that it may also be a mixture of several different plasticizers.

A thickener, in particular in the form of an organic thickener, may also be added to the filler, and hydrocarbon polymer may advantageously be used. The amount of the thickeners in the filler should expediently be chosen to be between 1 and 5% by weight. Additives in the form of small spheres may also be introduced as thickeners into the filler, in particular the use of small hollow spheres is advantageous owing to their great compressibility and easy processability. The external diameters of such small spheres are expediently substantially smaller than the diameter of the optical waveguide, i.e. under 100 μm.

The fillers may also expediently be mixed with further components and in particular an addition in the form of a thixotropic agent is expedient. Thixotropic agents have a particularly advantageous effect on the drip behavior. In particular, addition of finely divided $SiO_2$ (so-called colloidal silica—e.g. "Aerosil" from the firm Degussa) is expedient as a thixotropic agent. Furthermore, thixotropic agents my also comprise alumina and/or bentonites as well as mixtures of these substances. The addition of thixotropic agents should not exceed 30% by weight, and values between 7 and 12% by weight are particularly advantageous if the invention is used as a so-called wire or lead filler for optical waveguides. In such an optical transmission element, the filler is present between a protective covering and one or more optical waveguides.

For use as a thixotropic wire or lead filler, the following values are expedient:

Plasticizer: 80% by weight to 95% by weight
Thixotropic agent: 5% by weight to 15% by weight
Thickener: 1% by weight to 5% by weight In the case of thixotropic core fillers, the following values are expedient:

Plasticizer: 30% by weight to 90% by weight
Thixotropic agent: 5% by weight to 15% by weight
Thickener: 1% by weight to 5% by weight The proportion in the form of a plasticizer is expediently chosen so that the filler as a whole has a viscosity of between 5000 mPa·s and 25,000 mPa·s and preferably between 10,000 mPa·s and 15,000 mPa·s, at 20° C. In the region of the lowest temperature of the transmission element (−30° C.), the viscosity should expediently be less than 25,000 mPa·s, while in the region of the highest temperature (+60° C.) the viscosity should expediently still be 5000 mPa·s.

As a result of the addition in the form of a thickener, the viscosity of the filler can be increased according to requirements.

It is advantageous if the molecular composition of the plasticizer in the filler is chosen to be as uniform as possible.

As a result of this, the filler then exhibits particularly uniform behavior and, for example, certain components do not begin to drip out at certain limiting temperatures (separation of low molecular weight components), while others still show no tendency to drip out. The difference in the chain length of the molecules of the plasticizer should expediently be chosen to be less than a factor of 10.

If monomeric plasticizers are used, the molecular weight is advantageously chosen to be between 200 and 2000 g/mol, and it is preferable to use values of between 200 and 800 g/mol. When polymeric plasticizers are used, it is expedient to choose the average molecular weight to be between 1000 and 10,000 g/mol, and preferably between 3000 and 6000 g/mol.

Plasticizers having particularly advantageous properties and a low price are PVC plasticizers, i.e. substances which are added to PVC-based plastic materials. PVC plasticizers also have the advantage that they exhibit particularly little migration. Particularly aromatic and/or aliphatic polycarboxylates when used as plasticizers, are inert and particularly cheap organic substances which have a low vapor pressure and are produced in large amounts.

Esters can be particularly advantageously used in this composition, in particular the following groups of esters are usable:

phthalates, trimellitates, polyesters of adipic, sebacic and azelaic acid, phosphates, hydroxycarboxylates and fatty esters.

Examples of plasticizers comprising phthalates in the above groups are:

| | |
|---|---|
| Dibutyl phthalate | Diisononyl phthalate |
| Diisobutyl phthalate | (triply branched) |
| Benzyl butyl phthalate | Diisononyl phthalate |
| Dipentyl phthalate | (doubly-triply branched) |
| Di-2-ethylhexyl phthalate | Diisononyl phthalate |
| Diisooctyl phthalate | (singly-doubly branched) |
| Dicapryl phthalate | Diisonanyl phthalate |
| Di-n-octyl phthalate | Dinonyl phthalate |
| Dialphanyl phthalate | (straight-chain) |
| Di-n-alkyl (Alfo1610) phthalate | Diisodecyl phthalate |
| Di-n-alkyl (Alfo1810) phthalate | (trimeric propylene) |
| Di-n-alkyl (79) phthalate (Shell) | Diundecyl phthalate |
| Di-n-alkyl (711) phthalate (Shell) | Diisotridecyl phthalate |
| Di-n-alkyl (911) phthalate (Shell) | (tetrameric propylene) |
| | Dimethoxyglycol phthalate |

Examples of plasticizers based on polyesters of adipic, sebacic and azelaic acid are:

Sebacic acid: 1,10-Decanedlcarboxylic acid with 1,2-ethanediol (ethylene glycol)

1,3-propanediol 1,4-butanediol 1,3-butanediol (neopentylglycol)

2,2-dimethyl-1,3-propanediol di-2-ethylhexyl adipate diisononyl adipate diisodecyl adipate benzyl-2-ethylhexyl adipate Azelaic acid: 1,9-Nonanedicarboxylic acid with 1,3-propanediol 1,2-propanediol 1,4-butanediol
1,3-butanediol
1,6-hexanediol
1,5-pentanediol
di-2-ethylhexyl azelate
diisooctyl azelate
di-n-hexyl azelate
Adipic acid: 1,6-Hexanedicarborylic acid with
1,3-propanediol
1,2-propanediol
1,3-butanediol
1,4-butanediol
1,6-hexanediol:
hexamethylene glycol
neopentylglycol:
2,2-dimethyl-1,3-propanediol
dibutyl sebacate
dioctyl sebacate Examples of plasticizers obtained from phosphates are:
tricresyl phosphate
diphenyl cresyl phosphate
triphenyl phosphate
diphenyl-2-ethylhexyl phosphate
tributyl phosphate
tri-2-ethylhexyl phosphate Epoxide plasticizers may also advantageously be used within the scope of the invention.

Examples of epoxide plasticizers are:
epoxidized soya bean oil
epoxidized linseed oil
2-ethylhexyl epoxytallate
diisodecyl tetrahydro-4,5-epoxyphthalate Within the scope of the invention, the structure of the plasticizers is expediently chosen so that the plastiques have at least one polar group in the molecule. The polar group is advantageously a functional group or a hereto atom, such as, for example, a carboxyl group, a hydroxyl group, an ester group, ether groups or a hetero atom in the form of a nitrogen, phosphorus or halogen atom.

The polar behavior of the substances should expediently always be more polar than a pure carbon-hydrogen bond or than a pure polyolefin.

The invention also relates to an optical waveguide lead or wire having at least one optical waveguide.

The invention furthermore relates to an optical waveguide cable having at least one optical waveguide.

The composition of the fillers according to the invention for an optical transmission element (either as a lead or wire filler or as a core filler) is illustrated in greater detail below with reference to individual examples:

1st Example:

93% by weight of Palatinol AH (BASF) (di-2-ethylhexyl phthalate) and 7% by weight of a thixotropic agent in the form of colloidal silica were added in portions with thorough mixing. The material was then degassed at a medium stirring speed.

The properties of the thixotropic gel thus obtained are as follows:

Vapor pressure: <0.001 mbar

Viscosity: about 4000 mPa·s at 20° C. (plate/cone 50 1/sec)

Freezing point: −45° C.

Cone penetration at −30° C.: about 200 1/10 mm

The thixotropic gel was filled into 30 cm hollow wire tubes and stored vertically at various temperatures in a forced-draught drying oven. The drop point of the thixotropic material is >80° C.

2nd Example:

90% by weight of Witamol 500 (di-2-ethylhexyl sebacate, Hüls) and 10% by weight of colloidal silica were thoroughly mixed. The material was degassed with moderate stirring.

The properties of the thixotropic gel thus obtained are as follows:

Vapor pressure: <0.01 mbar

Viscosity: about 7000 mPa·s at 20° C. (plate/cone 50 1/sec)

Freezing point: <−65° C.

Cone penetration at −30° C.: about 190 1/10 mm

The thixotropic gel was filled into 30 cm hollow wire tubes at various temperatures and stored vertically in a forced-draught drying oven.

No dripping is observed even at temperatures >80° C.

3rd Example:

91% by weight of Palatinol Z (diisodecyl phthalate, BASF) was stirred with 9% by weight of colloidal silica to give a thixotropic gel. The material was degassed with moderate stirring.

The properties of the gel thus obtained are as follows:

Vapor pressure: <0.001 m bar

Viscosity: about 4000 mPa·s at 20° C. (plate/cone 50 1/sec)

Freezing point: <−40° C.

Cone penetration at −30° C.: about 200 1/10 mm

Efflux behavior of the wire filler according to FTZ TL 6015-3003, Appendix E (sieve method): passed.

4th Example:

44% by weight of Palatinol AH (di-2-ethylhexyl phthalate) and 44% by weight of Witamol 500 (di-2-ethylhexyl sebacate) were thoroughly mixed with 12% by weight of colloidal silica. The thixotropic material was degassed with moderate stirring.

The properties of the gel thus obtained are as follows:

Vapor pressure: <0.01 mbar

Viscosity: about 3500 mPa·s at 20° C. (plate/cone 50 1/sec)

Freezing point: <−45° C.

Cone penetration at −30° C.: about 200 1/10 mm

BRIEF DESCRIPTION OF THE DRAWINGS

FIG. 1 is a cross-sectional view of an optical transmission element containing a filler according to the invention within the protective covering; and FIG. 2 is a cross-sectional view of an optical transmission element in the form of an optical cable having a filler according to the invention as a core filler.

DESCRIPTION OF THE PREFERRED EMBODIMENTS

FIG. 1 shows a So-called hollow lead or wire GA (optical waveguide lead) in which at least one optical waveguide LW, which is surrounded on the outside by a protective coating CT, is arranged inside a protective covering SH of plastic material. A filler FC which surrounds the optical waveguide LW all around is provided for gently embedding this optical waveguide. This filler contains at least one component in the form of a plasticizer. Owing to the advantageous property of the filler thus produced, said filler is sufficiently soft in a wide temperature range, namely from −40° to +80°, so that mechanical stresses in the protective covering do not reach the optical waveguide LW or reach it only in greatly reduced form. The filler FC is furthermore distinguished by particularly good drip behavior, i.e. no filler emerges at a cut end of the hollow lead even, for example, when the cable is guided vertically and at correspondingly high temperatures of up to, for example, >80°.

FIG. 2 shows an optical cable or optical conductor group OC which forms an optical transmission element that contains three optical waveguide leads GA1, GA2 and GA3. These optical waveguide leads have a structure similar to that in FIG. 1 and in each case contain at least one optical waveguide LW1, LW2, LW3, which is surrounded by a corresponding protective coating CT1, CT2, CT3. Furthermore, a filler FC1–FC3, which is provided with a plasticizer and serves as a lead filler, is provided in each case within the associated protective covering SH1–SH3.

The outer spaces between the optical waveguide leads GA1–GA3, which are expediently stranded together, are filled with a core filler FCS which completely fills the total inner space up to the inner wall of the cable sheath CS. This gives a longitudinally water-tight optical waveguide cable OC which offers optimum protection both of the optical waveguide leads GA1–GA3 and additionally of the optical waveguides LW1–LW3 contained therein.

It is also possible for the element OC to form only one optical conductor group, and several such conductor groups may be stranded to form a larger cable, so that it would be necessary additionally to apply an outer protective sheath around the outside of these stranded groups.

We claim:

1. An elongated, optical transmission element comprising at least one optical waveguide, at least one protective covering enclosing the optical waveguide and a filler within the covering, the filler having a component in the form of monomeric plasticizers, said monomeric plasticizers having a molecular weight in a range of between 200 and 2,000 g/mol, said plasticizer accounting for between 30 and 99 percent by weight of the filler.

2. An elongated, optical transmission element according to claim 1, wherein the plasticizer accounts to between 80 and 95 percent by weight of the filler.

3. An elongated, optical transmission element according to claim 1, wherein the plasticizer is liquid at 20° C.

4. An elongated, optical transmission element according to claim 1, wherein the filler contains an additive in the form of a thixotropic agent.

5. An elongated, optical transmission element according to claim 4, wherein the filler contains a finely divided $SiO_2$.

6. An elongated, optical transmission element according to claim 1, wherein the filler contains a thickener.

7. An elongated, optical transmission element according to claim 6, wherein the thickener includes small spheres.

8. An elongated, optical transmission element according to claim 7, wherein the amount of thickener is chosen to be between 1 and 5 percent by weight of the composition.

9. An elongated, optical transmission element according to claim 1, wherein the amount of the plasticizer is selected so that the filler as a whole has a viscosity at 20° C. in a range of between 5,000 mPa·s and 25,000 mPa·s.

10. An elongated, optical transmission element according to claim 9, wherein the viscosity is in a range of 10,000 mPa·s and 15,000 mPa·s.

11. An elongated, optical transmission element according to claim 1, wherein the plasticizer has a molecular weight in a range of between 200 and 800 g/mol.

12. An elongated, optical transmission element according to claim 1, wherein the element is an optical waveguide lead with the filler surrounding each waveguide.

13. An elongated, optical transmission element according to claim 1, wherein the element is a waveguide cable having a core containing the optical waveguide and the covering surrounding the core with the filler being disposed between the core and covering.

14. An elongated, optical transmission element comprising at least one optical waveguide, at least one protective covering enclosing the optical waveguide and a filler within the covering, said filler having a component in the form of a plasticizer selected from a group consisting of PVC plasticizers, excluding PVC plasticizers having polypropyleneoxyglycol, said plasticizer accounting for between 80 and 99 percent by weight of the filler.

15. An elongated, optical transmission element comprising at least one optical waveguide, at least one protective covering enclosing the optical waveguide and a filler within the covering, said filler having a component in the form of a plasticizer containing at least one ester and being selected from a group consisting of PVC plasticizers, excluding PVC plasticizers having polypropyleneoxyglycol, said plasticizer accounting for between 30 and 99 percent by weight of the filler.

16. An elongated, optical transmission element according to claim 15, wherein the plasticizer contains at least one carboxylate.

17. An elongated, optical transmission element according to claim 15, wherein the plasticizer contains at least one phthalate.

18. An elongated, optical transmission element according to claim 15, wherein the plasticizer contains a trimellitate.

19. An elongated, optical transmission element according to claim 15, wherein the plasticizer contains a material selected from a group consisting of polyester of adipic acid, polyester of sebacic acid, and polyester of azelaic acid.

20. An elongated, optical transmission element according to claim 15, wherein the plasticizer contains a fatty ester.

21. An elongated, optical transmission element according to claim 14, wherein the plasticizer contains an epoxide plasticizer.

22. An elongated, optical transmission element according to claim 14, wherein the plasticizer contains at least one polar group per molecule of the plasticizer.

23. An elongated, optical transmission element according to claim 22, wherein the polar group is present in the form selected from a group consisting of functional groups and a heterol atom.

24. An elongated, optical transmission element according to claim 23, wherein the polar molecule of the plasticizer is more strongly polar than a pure hydrocarbon compound and pure polyolefins.

25. An elongated, optical transmission element according to claim 14, wherein the element is an optical waveguide lead with the filler surrounding each waveguide.

26. An elongated, optical waveguide element according to claim 14, wherein the element is an optical cable having a core containing all the waveguides and the covering surrounds the core with the filler disposed therebetween.

* * * * *